US011044086B2

United States Patent
Choi et al.

(10) Patent No.: US 11,044,086 B2
(45) Date of Patent: Jun. 22, 2021

(54) APPARATUS FOR GENERATING IDENTIFICATION KEY AND MANAGEMENT METHOD THEREOF

(71) Applicants: ICTK Holdings Co., Ltd., Seongnam-si (KR); IUCF-HYU(INDUSTRY-UNIVERSITY COOPERATION FOUNDATION HANYANG UNIVERSITY), Seoul (KR)

(72) Inventors: Byong Deok Choi, Seoul (KR); Dong Kyue Kim, Seoul (KR)

(73) Assignees: ICTK Holdings Co., Ltd., Seongnam-si (KR); UCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 277 days.

(21) Appl. No.: 16/071,008

(22) PCT Filed: Jan. 19, 2017

(86) PCT No.: PCT/KR2017/000650
§ 371 (c)(1),
(2) Date: Oct. 10, 2018

(87) PCT Pub. No.: WO2017/126900
PCT Pub. Date: Jul. 27, 2017

(65) Prior Publication Data
US 2019/0036690 A1   Jan. 31, 2019

(30) Foreign Application Priority Data

Jan. 19, 2016   (KR) .................. 10-2016-0006564

(51) Int. Cl.
*H04L 29/06* (2006.01)
*H04L 9/08* (2006.01)
(Continued)

(52) U.S. Cl.
CPC .............. *H04L 9/0866* (2013.01); *G06K 9/00* (2013.01); *G09C 1/00* (2013.01); *H01L 27/0629* (2013.01);
(Continued)

(58) Field of Classification Search
CPC ........... H04L 9/0866; H04L 9/08; H04L 9/32; G06K 9/00; G09C 1/00
See application file for complete search history.

(56) References Cited

U.S. PATENT DOCUMENTS 5,881,155 A      3/1999  Rigal
2004/0236895 A1* 11/2004  Callaway .................. G06F 1/26
                                                    711/1
(Continued)

FOREIGN PATENT DOCUMENTS

EP    2933720 A1   10/2015
EP    3026672 A1    6/2016
(Continued)

OTHER PUBLICATIONS

European Patent Office, Extended European Search Report Issued in Application No. 17741666.6, dated Aug. 1, 2019, Germany, 7 pages.
(Continued)

*Primary Examiner* — Jeffrey C Pwu
*Assistant Examiner* — Rodman Alexander Mahmoudi
(74) *Attorney, Agent, or Firm* — McCoy Russell LLP

(57) ABSTRACT

Provided are an apparatus and a method for generating an identification key with improved reliability by: providing a plurality of resistances which are generated according to a
(Continued)

random connection state between conductive layers of a semiconductor due to process variation of the semiconductor; discriminating a first group which has a resistance value greater than a first threshold value and less than a second threshold value among the plurality of resistances; and reading at least one resistance which does not belong to the first group out of the plurality of resistances and reading an identification key in the form of a digital value.

20 Claims, 8 Drawing Sheets

(51) Int. Cl.
  *G06K 9/00* (2006.01)
  *H04L 9/32* (2006.01)
  *G09C 1/00* (2006.01)
  *H01L 27/06* (2006.01)
(52) U.S. Cl.
  CPC ............... *H04L 9/08* (2013.01); *H04L 9/32* (2013.01); *H04L 2209/12* (2013.01)

(56) References Cited

U.S. PATENT DOCUMENTS

| | | | | |
|---|---|---|---|---|
| 2008/0009671 A1* | 1/2008 | Kimoto | ............... | A61B 1/041 |
| | | | | 600/109 |
| 2008/0088534 A1* | 4/2008 | Son | ............... | G09G 3/2927 |
| | | | | 345/60 |
| 2009/0146739 A1* | 6/2009 | Shimizu | ............... | H03F 3/08 |
| | | | | 330/288 |
| 2014/0140502 A1 | 5/2014 | Brightsky et al. | | |
| 2015/0213885 A1 | 7/2015 | Katoh | | |
| 2015/0301802 A1* | 10/2015 | Katoh | ............... | G11C 13/0002 |
| | | | | 708/190 |

FOREIGN PATENT DOCUMENTS

| | | |
|---|---|---|
| KR | 1020090068987 A | 6/2009 |
| KR | 101139630 B1 | 5/2012 |
| KR | 101332517 B1 | 11/2013 |
| KR | 101457305 B1 | 11/2014 |

OTHER PUBLICATIONS

ISA Korean Intellectual Property Office, International Search Report Issued in Application No. PCT/KR2017/000650, dated Apr. 12, 2017, WIPO, 4 pages.

European Patent Office, Communication pursuant to Article 94(3) EPC Issued in Application No. 17741666.6, dated Oct. 30, 2020, Germany, 4 pages.

* cited by examiner

Inverter input/output characteristics

APPARATUS FOR GENERATING IDENTIFICATION KEY AND MANAGEMENT METHOD THEREOF

TECHNICAL FIELD

The following description relates to a digital security field, and more particularly, to an apparatus for generating an identification key used for a digital signature and an encryption and decryption method, and a management method thereof.

BACKGROUND ART

A physically unclonable function (PUF) may provide an unpredictable digital value. Individual PUFs may provide different digital values, even though an accurate manufacturing process is provided and the individual PUFs are manufactured through the same manufacturing process.

The PUF may be referred to as a "physical one-way function (POWF)" that is practically impossible to be duplicated, or as a "physical random function (PRF)."

The above characteristic of the PUF may be used to generate an encryption key for security and/or authentication. For example, the PUF may be used to provide a unique key to distinguish devices from one another.

Korean Patent Registration No. 10-1139630 (hereinafter, referred to as "'630 patent") provides a method of implementing a PUF. The '630 patent discloses a method of generating a PUF by probabilistically determining whether an inter-layer contact or a via is generated between conductive layers or conductive nodes of a semiconductor, based on a semiconductor process variation.

In one of embodiments disclosed in the '630 patent, a via to be formed between conductive layers may be designed to be small in size, and accordingly a situation in which the via is formed, and a situation in which the via is not formed may randomly occur. In other words, a random digital value may be generated, and artificially guessing of the random digital value is impossible.

(Patent Document 1) Korean Patent Registration No. 10-1139630

DISCLOSURE OF INVENTION

Technical Solutions

According to an aspect, there is provided an identification key generation apparatus including an identification key provider configured to provide a plurality of resistors generated based on a random connection state between conductive layers of a semiconductor due to a semiconductor process variation, a discriminator configured to discriminate a first group having a resistance value greater than a first threshold value and less than a second threshold value among the plurality of resistors, and a reader configured to read at least one resistor that does not belong to the first group among the plurality of resistors, and to provide an identification key in a form of a digital value.

The identification key generation apparatus may further include a controller configured to record, in a memory, information used to identify a resistor included in the first group among the plurality of resistors. The information used to identify the resistor included in the first group may be an address of the resistor included in the first group among the plurality of resistors.

The plurality of resistors may be vias or contacts located between the conductive layers.

The discriminator may include a first discrimination element configured to determine whether a value of each of the plurality of resistors is greater than the first threshold value, in a first time interval, and a second discrimination element configured to determine whether a value of each of the plurality of resistors is greater than the second threshold value, in a second time interval different from the first time interval.

The discriminator may further include a third discrimination element configured to determine whether a value of each of the plurality of resistors is greater than a third threshold value, and the third threshold value may be greater than the first threshold value and less than the second threshold value. The reader may be configured to provide the identification key based on a result of a comparison between the third threshold value and a value of at least one resistor that does not belong to the first group among the plurality of resistors.

According to another aspect, there is provided an identification key generation apparatus including an identification key provider configured to provide a plurality of resistors generated based on a random connection state between conductive layers of a semiconductor due to a semiconductor process variation, a discriminator configured to discriminate a first group having a resistance value greater than a first threshold value and less than a second threshold value among the plurality of resistors, using a pull-up resistor configured to pull an output voltage applied to each of the plurality of resistors up to a supply voltage in an off state of a selection transistor, and a reader configured to read at least one resistor that does not belong to the first group among the plurality of resistors and to provide an identification key in a form of a digital value.

The discriminator may be configured to discriminate, as the first group, a resistor at which a time required to discharge the output voltage to be less than or equal to a threshold voltage after the selection transistor is turned on is greater than a first threshold time and less than a second threshold time, among the plurality of resistors.

The reader may be configured to read the identification key based on a result of a comparison between a third threshold time and the time required to discharge the output voltage to be less than or equal to the threshold voltage, using at least one resistor that does not belong to the first group among the plurality of resistors, and the third threshold time may be greater than the first threshold time and less than the second threshold time.

The discriminator may be configured to discriminate, as the first group, a resistor of which the output voltage is greater than a first threshold voltage and less than a second threshold voltage when a predetermined reference time elapses after the selection transistor is turned on, among the plurality of resistors.

The reader may be configured to read the identification key based on a result of a comparison between the output voltage and a third threshold voltage, using at least one resistor that does not belong to the first group among the plurality of resistors, and the third threshold voltage may be greater than the first threshold voltage and less than the second threshold voltage.

According to another aspect, there is provided a method of generation an identification key, the method including discriminating a first group having a resistance value greater than a first threshold value and less than a second threshold value among a plurality of resistors generated based on a random connection state between conductive layers of a semiconductor due to a semiconductor process variation, and reading at least one resistor that does not belong to the first group among the plurality of resistors and generating an identification key in a form of a digital value.

The method may further include recording, in a memory, information used to identify a resistor included in the first group among the plurality of resistors. The information used to identify the resistor included in the first group may be an address of the resistor included in the first group among the plurality of resistors.

The plurality of resistors may be either vias or contacts located between the conductive layers.

The discriminating of the first group may include determining whether a value of each of the plurality of resistors is greater than the first threshold value, in a first time interval, and determining whether a value of each of the plurality of resistors is greater than the second threshold value, in a second time interval different from the first time interval.

The discriminating of the first group may further include determining whether a value of each of the plurality of resistors is greater than a third threshold value, the third threshold value being greater than the first threshold value and less than the second threshold value. The generating of the identification key may include generating the identification key based on a result of a comparison between the third threshold value and a value of at least one resistor that does not belong to the first group among the plurality of resistors.

BEST MODE FOR CARRYING OUT THE INVENTION

Figure 1:
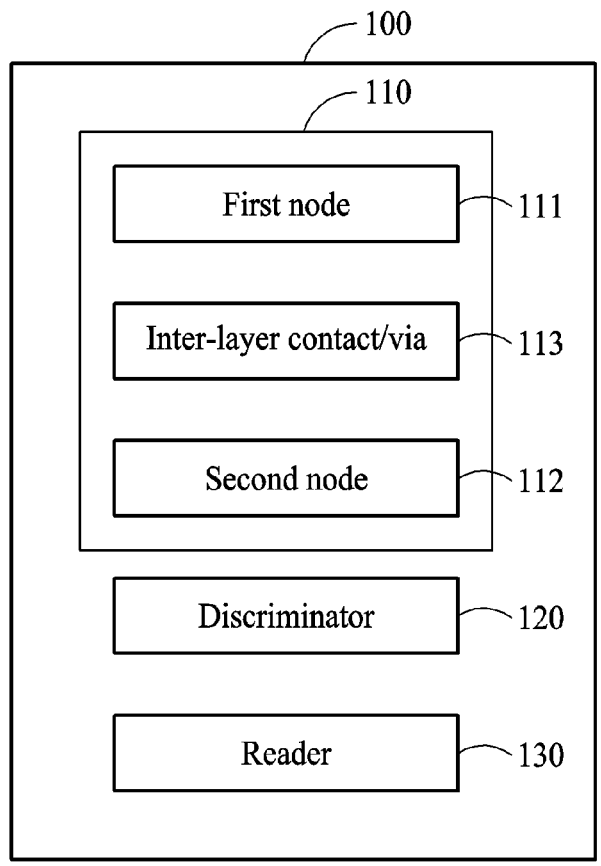
FIG. 1 is a block diagram illustrating an identification key generation apparatus according to an embodiment.

The following structural or functional descriptions are exemplary to merely describe embodiments, and the scope of the embodiments is not limited to the descriptions provided in the present specification. Various changes and modifications can be made thereto after an understanding of the present disclosure.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component.

It will be understood that when a component is referred to as being "connected to" another component, the component may be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art after an understanding of the present disclosure. Terms defined in dictionaries generally used should be construed to have meanings matching with contextual meanings in the related art and the present disclosure and are not to be construed as an ideal or excessively formal meaning unless otherwise defined herein.

In the following description, embodiments may be used to recognize a fingerprint of a user. An operation of recognizing a fingerprint of a user may include an operation of authenticating or identifying the user. In an example, an operation of authenticating a user may include an operation of determining whether the user is enrolled in advance. In this example, a result obtained by authenticating the user may be output as true or false. In another example, an operation of identifying a user may include an operation of determining that the user corresponds to any one user among a plurality of pre-enrolled users. In this example, a result obtained by identifying the user may be output as an identification (ID) of any one pre-enrolled user. When the user does not correspond to any one user among the plurality of pre-enrolled users, a signal indicating that the user is not identified may be output.

Embodiments may be implemented as various types of products, for example, personal computers (PCs), laptop computers, tablet computers, smartphones, televisions (TV), smart home appliances, intelligent vehicles, kiosks or wearable devices. For example, examples embodiments may be employed to authenticate a user in a smartphone, a mobile device or a smart home system. Embodiments may be applicable to a payment service by user authentication. Also, examples embodiments may be applicable to an intelligent vehicle system to automatically start a vehicle by authenticating a user. Hereinafter, examples embodiments will be described in detail below with reference to the accompanying drawings, and like reference numerals refer to the like elements throughout.

FIG. 1 is a block diagram illustrating an identification key generation apparatus according to an embodiment.

In an example, an identification key generation apparatus 100 may include an identification key provider 110, a discriminator 120 and a reader 130. The identification key generation apparatus 100 may further include a memory (not shown) and a controller (not shown).

The identification key provider 110 may provide an identification key having randomness, using a semiconductor process. For example, the identification key provider 110 may include an inter-layer contact or via (inter-layer contact/via) 113 that connects a first node 111 and a second node 112 corresponding to conductive layers of a semiconductor.

Generally, an inter-layer contact or a via is designed to connect conductive layers, whereas in an embodiment, the inter-layer contact/via 113 may be intentionally designed to have randomness so that nodes may be shorted or open in a semiconductor process, which has been disclosed in detail in the '630 patent. A connection characteristic of the inter-layer contact/via 113 formed as described above may be measured and expressed as a resistance value between the first node 111 and the second node 112 that are connected by the inter-layer contact/via 113. Also, a resistance value of the inter-layer contact/via 113 may be compared to a predetermined threshold value, and whether an electrical short occurs may be determined.

The identification key provided by the identification key generation apparatus 100 may desirably have time invariance, that is, the identification key may be invariant over time. For example, a plurality of inter-layer contacts/vias 113 intentionally designed to have randomness may have various resistance value distributions in a probabilistic manner. When an inter-layer contact/via 113 is manufactured, a connection state (for example, a resistance value, or a binary value digitized by comparing the resistance value to a threshold value) of the inter-layer contact/via 113 may remain unchanged, that is, invariant over time.

However, due to a variety of causes, for example, an influence of naturally occurring noise, an influence of an environment, such as a temperature or humidity, and/or aging of a circuit over time, a resistance value between a first node and a second node may slightly change. The above change may be a negative factor in terms of time invariance. In other words, since resistance values slightly change due to aging of elements or an environmental change, it may be easily understood that a digitized result value of a corresponding element may change when a resistance value that does not exceed a threshold value exceeds the threshold value or when a resistance value exceeding the threshold value does not exceed the threshold value. Also, even though a physical value does not change, an error of a "measurement" is an inevitable measurement phenomenon, which also functions as a negative factor in terms of the above-described time invariance. Thus, embodiments provide solutions to remove the time invariance.

To solve the above problem of time invariance, the discriminator 120 may discriminate, as a first group (that is, a unused group or an invalid group), a resistance of the inter-layer contact/via 113 in a resistance value range in which time invariance is expected not to be guaranteed. The reader 130 may provide an identification key of a physically unclonable function (PUF) in a form of a digital value based on a resistance of the inter-layer contact/via 113 that does not belong to the first group among binary values provided by the PUF.

For example, the identification key generation apparatus 100 may record information used to identify a resistor discriminated as a resistor included in the first group by the discriminator 120 in the memory (not shown), using the controller. In this example, the information stored in the memory may be an address of the resistor included in the first group. A resistor corresponding to an address stored in the memory may be recognized to have time variance, and may be excluded so as not to be used during providing of the identification key. Thus, the identification key generation apparatus 100 may increase reliability of a finally provided identification key by excluding a resistor of the first group with time invariance expected not to be guaranteed, when the identification key is read from the reading unit 130.

Figure 2:
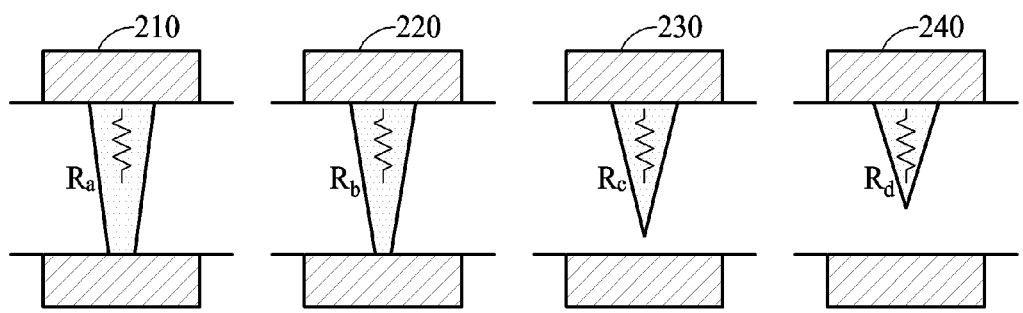
FIG. 2 is a diagram illustrating a characteristic of a physically unclonable function (PUF) of a via of an identification key generation apparatus according to an embodiment.
Figure 3:
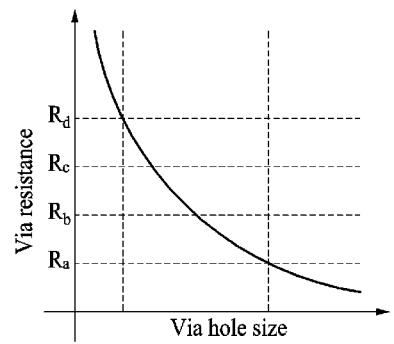
FIG. 3 is a diagram illustrating a characteristic of a PUF of a via of an identification key generation apparatus according to an embodiment.

FIGS. 2 and 3 are diagrams illustrating a characteristic of a PUF of a via of an identification key generation apparatus according to an embodiment. As described above, a plurality of vias designed to have randomness may have various resistance value distributions in a probabilistic manner based on, for example, a size of a via hole formed in the semiconductor process, and the like. Accordingly, the plurality of vias may be modeled as resistors 210, 220, 230 and 240 of FIG. 2.

The resistors 210, 220, 230 and 240 may have values of $R_a$, $R_b$, $R_c$ and $R_d$, respectively. For example, when $R_a < R_b < R_e < R_d$, and $R_b < R_{th} < R_c$ in which $R_{th}$ denotes a threshold value are satisfied, the resistors 210 and 220 may be determined to be shorted, and the resistors 230 and 240 may be determined to be open. In this example, the resistors 210 and 240 may be expected to have time invariance due to a relatively great difference between $R_{th}$ and each of $R_a$ and $R_d$. However, due to a relatively small difference between $R_{th}$ and each of $R_b$ and $R_c$, the resistors 220 and 230 may have a high possibility of an occurrence of a time variance problem based on a condition, for example, noise, during reading of an identification key.

As a result, when the resistors 220 and 230 are used together to provide an identification key, reliability of a finally provided identification key may decrease. Thus, the resistors 220 and 230 with time invariance expected not to be guaranteed may desirably be excluded from a generation of an identification key.

Figure 4:
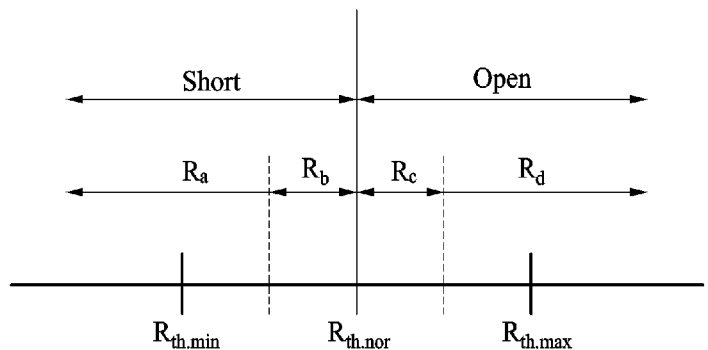
FIG. 4 is a diagram illustrating a process of discriminating a resistance of an inter-layer contact or a via in an identification key generation apparatus according to an embodiment.

FIG. 4 is a diagram illustrating a process of discriminating a resistance of an inter-layer contact or a via in an identification key generation apparatus according to an embodiment. The identification key generation apparatus may discriminate and select, in advance, a resistance with time invariance expected not to be guaranteed, and may store an address value corresponding to the resistance in a separate memory device.

Since data stored in the memory device is an address of a resistor recognized to have time variance, the data is not information requiring security. Unlike the above-described embodiment, it is possible to implement a method of storing an address of a resistor with time invariance expected to be guaranteed in a memory device.

A first threshold value $R_{th.min}$ and a second threshold value $R_{th.max}$ for a determination of reliability may be selected. When a third threshold value $R_{th.nor}$ is used as a criterion to read a digital value of "0" or "1" to be used for a generation of an identification key from each resistance, the third threshold value $R_{th.nor}$ may be greater than the first threshold value $R_{th.min}$ and less than the second threshold value $R_{th.max}$.

The first threshold value $R_{th.min}$ and the second threshold value $R_{th.max}$ may be threshold values to discriminate a resistance with low reliability, and may be selected as values obtained by applying a constant margin to a boundary value between $R_a$ and $R_b$ or a boundary value between $R_c$ and $R_d$ to increase reliability. In an example, a value of a target resistance to be discriminated is denoted by $R_{via}$. In this example, when $R_{via} < R_{th.min}$ is satisfied, the target resistance may be read as "short" with high reliability. When $R_{via} > R_{th.max}$ is satisfied, the target resistance may be read as "open" with high reliability. However, when $R_{th.min} < R_{via} < R_{th.max}$ is satisfied, the target resistance may be discriminated as a resistance with low reliability and excluded from a generation of an identification key.

In an example, a relationship between $R_{via}$, and $R_{th.min}$, $R_{th.nor}$ and $R_{th.max}$ may be expressed as shown in Table 1 below.

TABLE 1

| $R_{via}$ | $R_{th.min}$(=10k) | $R_{th.nor}$(=100k) | $R_{th.max}$(=1M) |
|---|---|---|---|
| $R_{via}$ < 10k | Short | Short | Short |
| $R_{via}$ = 10k | Open/short | Short | Short |
| 10k < $R_{via}$ < 100k | Open | Short | Short |
| $R_{via}$ = 100k | Open | Open/short | Short |
| 100k < $R_{via}$ < 1M | Open | Open | Short |
| $R_{via}$ = 1M | Open | Open | Open/short |
| $R_{via}$ > 1M | Open | Open | Open |

As shown in Table 1, $R_{th.min}$=10 k, $R_{th.nor}$=100 k, and $R_{th.max}$=1M are selected. For example, a discriminator may include three discrimination elements respectively corresponding to the above threshold values to compare Rvia and each of the threshold values. Each of the discrimination elements may include a transistor or a resistor.

In an example of $R_{via}$<10 k, discrimination results may be "short" in all the three discrimination elements. In an example of $R_{via}$=10 k, a discrimination result may be "open" or "short in an $R_{th.min}$ discrimination element, due to a factor such as noise, and the like. In this example, when the discrimination result is "short", a resistor may be stably shorted in the same manner as an example of $R_{th.min}$<10 k. When the discrimination result is "open", the resistor may be shorted with low reliability. In an example of 10 k<$R_{via}$<100 k, a discrimination result may be "open" in an $R_{th.min}$ discrimination element, and discrimination results may be "short" in the other discrimination elements. In an example of $R_{via}$=100 k, a discrimination result may be "open" or "short" in an $R_{th.nor}$ discrimination element due to a factor such as noise, and the like. In this example, the discrimination result of "short" may be the same as the example of 10 k<$R_{via}$<100 k, and the discrimination result of "open" may be the same as an example of 100k<$R_{via}$<1M. In the example of 100 k<$R_{via}$<1M, a discrimination result may be "short" in an $R_{th.max}$ discrimination element, and discrimination results may be "open" in the other discrimination elements. In an example of $R_{via}$=1M, a discrimination result may be "open" or "short" in an $R_{th.max}$ discrimination element due to noise, and the like. In this example, the discrimination result of "short" may be the same as the example of 100 k<$R_{via}$<1M, and the discrimination result of "open" may be the same as an example of $R_{via}$>1M. In the example of $R_{via}$>1M, discrimination results 3 may be "open" in all the three discrimination elements.

Figure 5A:
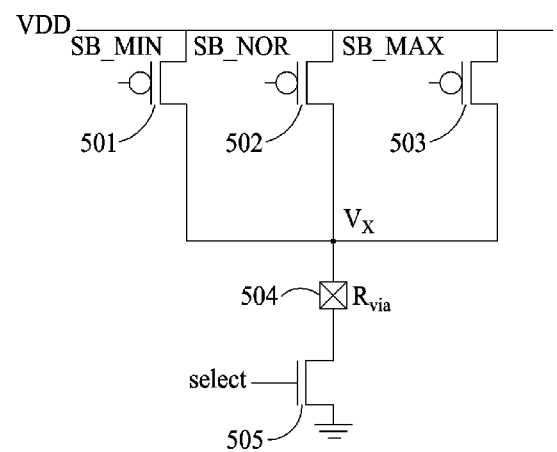
FIGS. 5A and 5B are diagrams illustrating a discriminator of an identification key generation apparatus according to an embodiment.
Figure 5B:
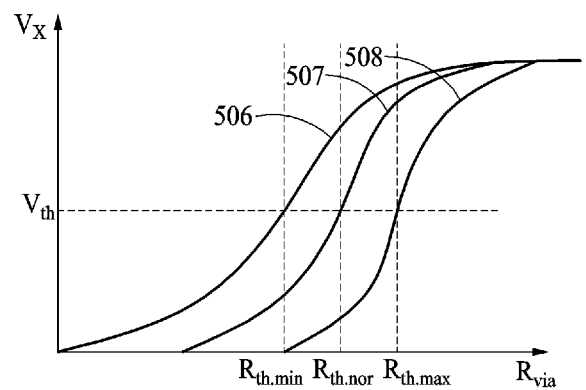

FIGS. 5A and 5B are diagrams illustrating a discriminator of an identification key generation apparatus according to an embodiment.

In an embodiment, the discriminator may include a first transistor 501, a second transistor 502, a third transistor 503, and a selection transistor 505. FIG. 5A also illustrates a via 504 that provides an identification key.

The first transistor 501, the second transistor 502 and the third transistor 503 may be configured to compare a reference resistance value $R_{via}$ to $R_{th.min}$, $R_{th.nor}$ and $R_{th.max}$, respectively.

For example, when the first transistor 501 is selected, a relationship between $R_{via}$ and $V_x$ may be formed as indicated by reference numeral 506 of FIG. 5B. In other words, when $R_{via}$ is equal to $R_{th.min}$, "$V_x=V_{th}$" may be satisfied. Based on the above configuration, $R_{via}$ and $R_{th.min}$ may be compared using the first transistor 501.

When the second transistor 502 is selected, the relationship between $R_{via}$ and $V_x$ may be formed as indicated by reference numeral 507 of FIG. 5B. In other words, when $R_{via}$ is equal to $R_{th.nor}$, "$V_x=V_{th}$" may be satisfied. Based on the above configuration, $R_{via}$ and $R_{th.nor}$ may be compared using the second transistor 502.

When the third transistor 503 is selected, the relationship between $R_{via}$ and $V_x$ may be formed as indicated by reference numeral 508 of FIG. 5B. In other words, when $R_{via}$ is equal to Rth.max, "$V_x=V_{th}$" may be satisfied. Based on the above configuration, $R_{via}$ and $R_{th.max}$ may be compared using the third transistor 503.

Figure 6A:
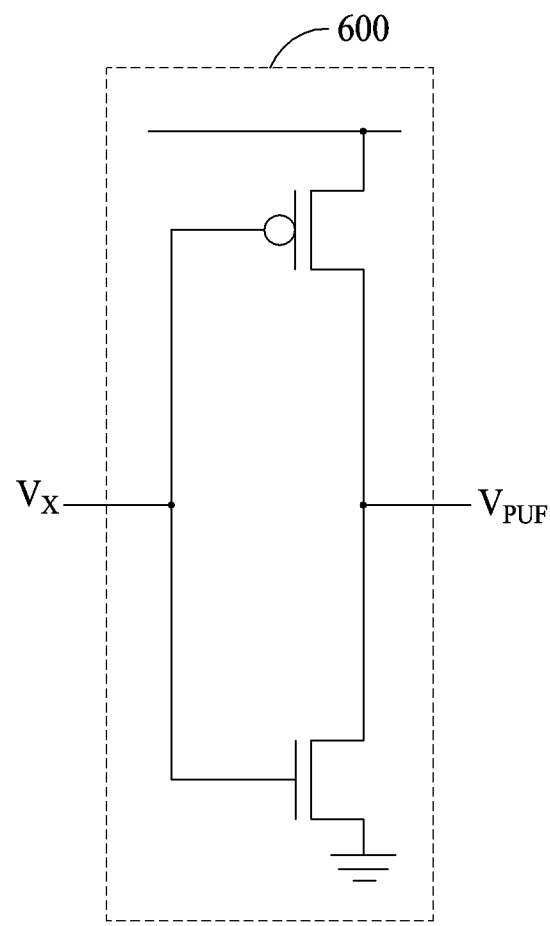
FIGS. 6A through 6C are diagrams illustrating a reader of an identification key generation apparatus according to an embodiment.
Figure 6B:
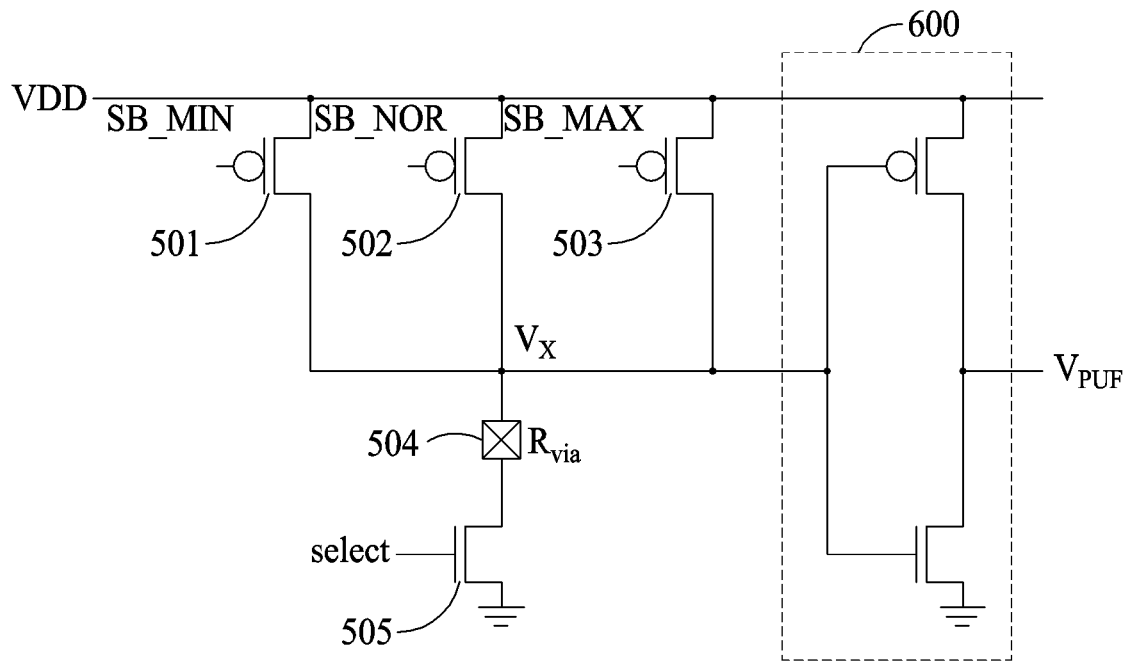
Figure 6C:
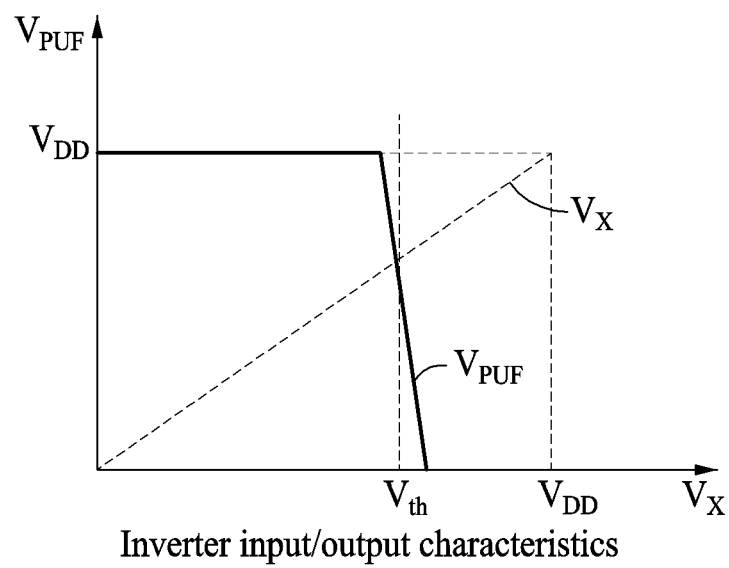

FIGS. 6A through 6C are diagrams illustrating a reader of an identification key generation apparatus according to an embodiment.

In an example, the reader may include an inverter 600 as shown in FIG. 6A. The inverter 600 may be configured to have $V_{th}$ as a logic threshold voltage. For example, the inverter 600 may be used as a reader for an output voltage $V_X$ of a discriminator, as shown in FIG. 6B.

Referring to FIG. 6C, $V_{PUF}$ may have a value of "0" in a portion of $V_x > V_{th}$, and $V_{PUF}$ may have a value of "1" in a portion of $V_x < V_{th}$. In another example, $V_{PUF}$ may be designed to have a value opposite to the above-described example. Thus, a value of $V_x$ may be read by selecting the first transistor 501, the second transistor 502 and the third transistor 503 one by one in a discrimination operation, and only the second transistor 502 may be selected in an identification key reading operation.

In an example of $R_{via} < R_{th.min}$, values of "0", "0", and "0" may be read by selecting the first transistor 501, the second transistor 502 and the third transistor 503 one by one, and a discrimination result may be "short" indicating that time invariance is guaranteed.

In an example of $R_{th.min} < R_{via} < R_{th.nor}$, values of "1", "0", and "0" may be read by selecting the first transistor 501, the second transistor 502 and the third transistor 503 one by one, and a discrimination result may be "short" indicating that time invariance is not guaranteed.

In an example of $R_{th.min} < R_{via} < R_{th.nor}$, values of "1", "1", and "0" may be read by selecting the first transistor 501, the second transistor 502 and the third transistor 503 one by one, and a discrimination result may be "open" indicating that time invariance is not guaranteed.

In an example of $R_{via} > R_{th.max}$, values of "1", "1", and "1" may be read by selecting the first transistor 501, the second transistor 502 and the third transistor 503 one by one, and a discrimination result may be "open" indicating that time invariance is guaranteed.

Figure 7:
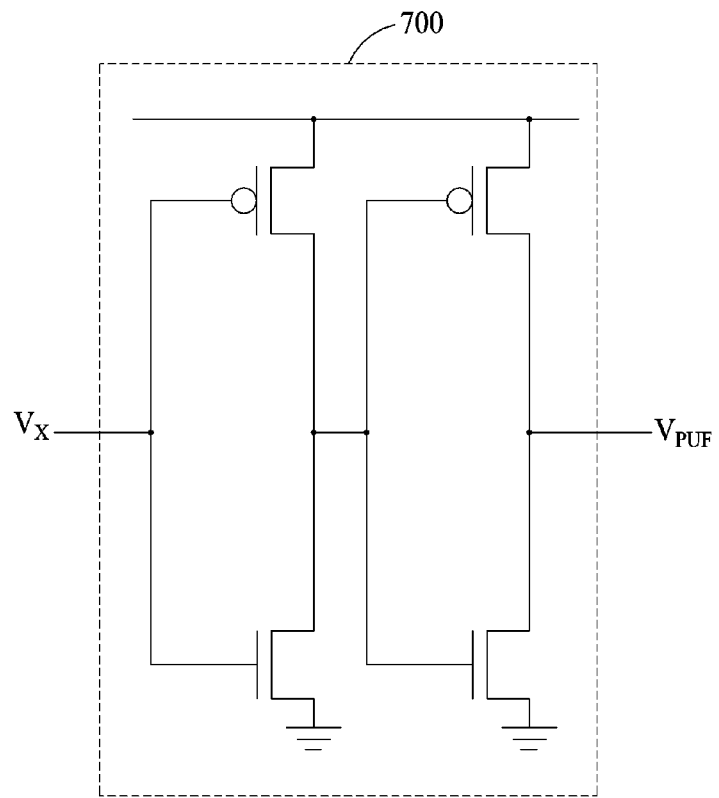
FIG. 7 is a diagram illustrating a reader of an identification key generation apparatus according to an embodiment.
Figure 8:
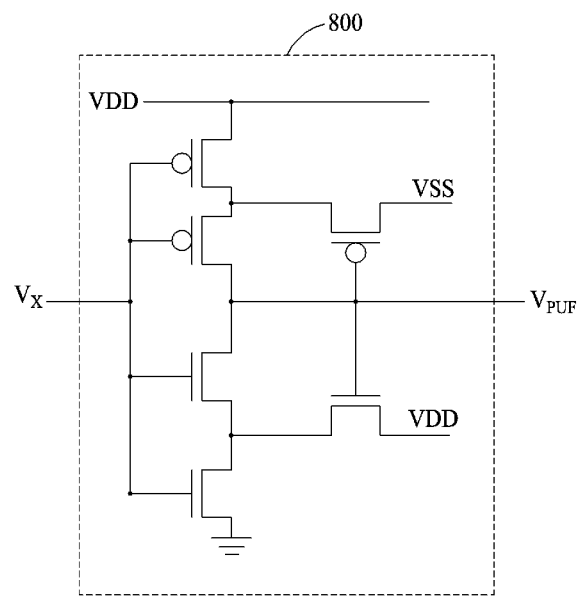
FIG. 8 is a diagram illustrating a reader of an identification key generation apparatus according to an embodiment.

FIGS. 7 and 8 are diagrams illustrating a reader of an identification key generation apparatus according to an embodiment. For example, instead of the inverter 600 of FIG. 6A, a logic buffer 700 of FIG. 7 or a Schmitt trigger inverter 800 of FIG. 8 may be used.

The logic buffer 700 and/or the Schmitt trigger inverter 800 may be configured to have $V_{th}$ as a logic threshold voltage, and may be used as a reader for an output voltage $V_x$ of a discriminator, as described above with reference to FIGS. 6B and 6C.

Figure 9A:
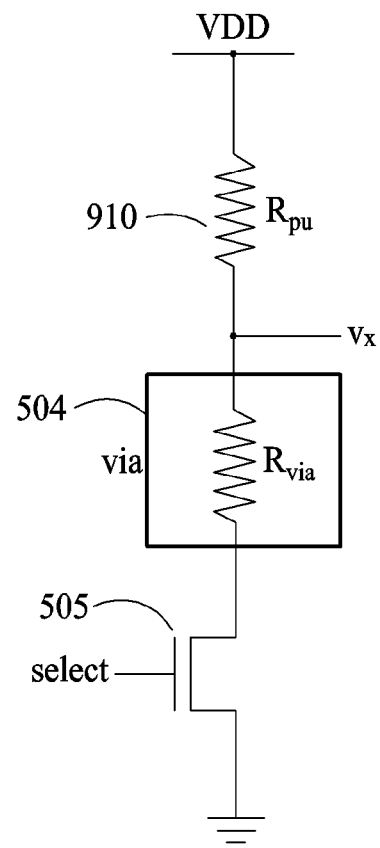
FIGS. 9A and 9B are diagrams illustrating a discriminator of an identification key generation apparatus according to an embodiment.
Figure 9B:
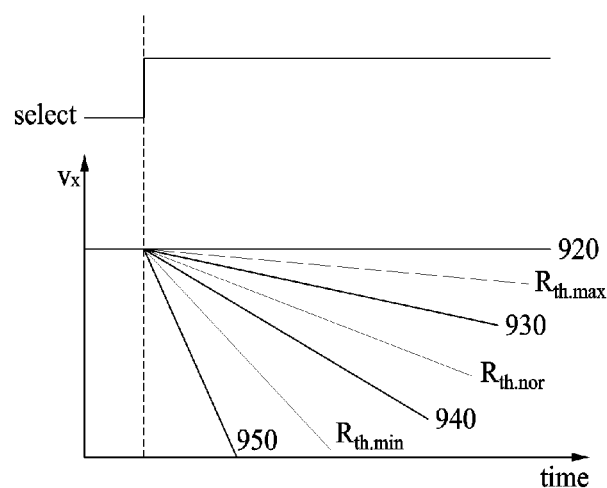

FIGS. 9A and 9B are diagrams illustrating a discriminator of an identification key generation apparatus according to an embodiment.

In an example, the discriminator of the identification key generation apparatus may include a pull-up resistor 910 and a selection transistor 505. The pull-up resistor 910 may be configured to pull $V_x$ up to VDD while a selection transistor is in an off state. FIG. 9A also illustrates a via 504 that provides an identification key.

A rate at which a pulled-up voltage is discharged based on a value of $R_{via}$ after the selection transistor 505 is turned on may change due to an RC delay, and accordingly the value of $R_{via}$ may be measured based on the rate, to determine whether an electrical short by a via occurs.

In an example, a discharge rate after the selection transistor 505 is turned on may be lower than a discharge rate corresponding to $R_{th.max}$, as indicated by reference numeral 920 of FIG. 9B, which may be determined as $R_{via} > R_{th.max}$.

In another example, the discharge rate after the selection transistor 505 is turned on may be higher than a discharge rate corresponding to $R_{th.max}$, and may be lower than a discharge rate corresponding to $R_{th.nor}$, as indicated by reference numeral 930 of FIG. 9B, which may be determined as $R_{th.min} < R_{via} < R_{th.nor}$.

In another example, the discharge rate after the selection transistor 505 is turned on may be higher than a discharge rate corresponding to $R_{th.nor}$, and may be lower than a discharge rate corresponding to $R_{th.min}$, as indicated by reference numeral 940 of FIG. 9B, which may be determined as $R_{th.min} < R_{via} < R_{th.nor}$.

In another example, the discharge rate after the selection transistor 505 is turned on may be higher than a discharge rate corresponding to $R_{th.min}$, as indicated by reference numeral 950 of FIG. 9B, which may be determined as $R_{via} < R_{th.min}$.

Figure 10A:
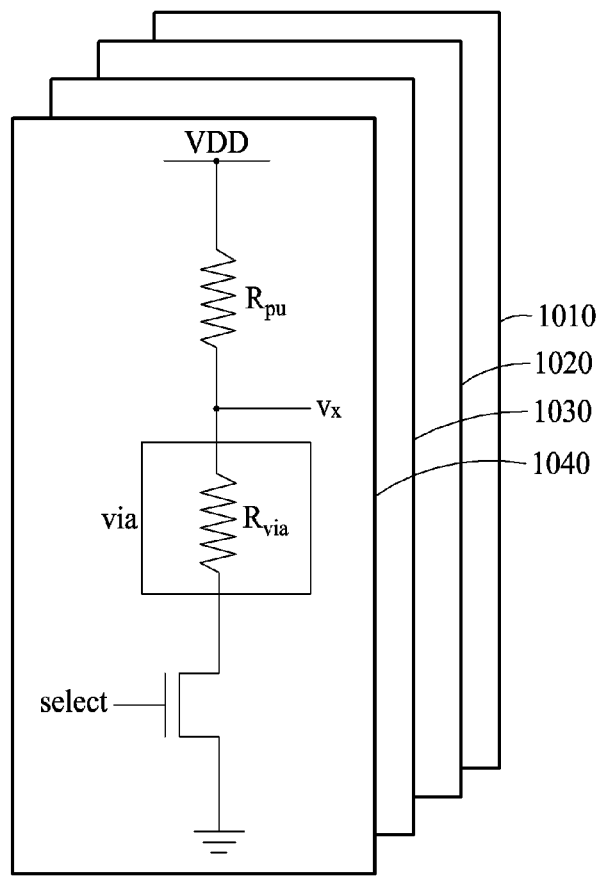
FIGS. 10A and 10B are diagrams illustrating a reader of an identification key generation apparatus according to an embodiment.
Figure 10B:
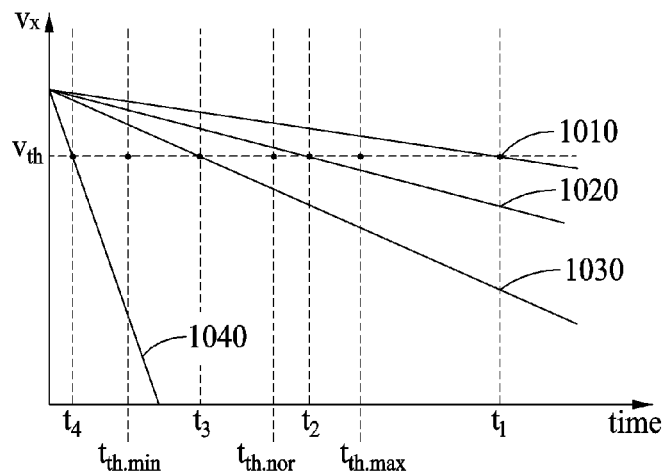

FIGS. 10A and 10B are diagrams illustrating a reader of an identification key generation apparatus according to an embodiment.

In an example, the reader of the identification key generation apparatus may include a pull-up resistor $R_{pu}$ and a selection transistor select. The pull-up resistor $R_{pu}$ may be configured to pull $V_x$ up to VDD while the selection transistor is in an off state. FIG. 10A also illustrates a via $R_{via}$ that provides an identification key.

A rate at which a pulled-up voltage is discharged up to a threshold voltage $V_{th}$ based on a value of $R_{via}$ after the selection transistor is turned on may change due to an RC delay, and accordingly an identification key may be read from the value of $R_{via}$ based on the rate.

For example, when an amount of time required to discharge the pulled-up voltage to the threshold voltage $V_{th}$ is denoted by t, an identification key generator with time variance may be verified based on a first threshold time $t_{th.min}$ and a second threshold time $t_{th.max}$. Also, a final identification key may be read based on a third threshold time $t_{th.nor}$.

In an example, PUF=1 may be read when $t \geq t_{th.nor}$ is satisfied, as indicated by reference numerals 1010 and 1020 of FIG. 10B, and PUF=0 may be read when $t \leq t_{th.nor}$ is satisfied, as indicated by reference numerals 1030 and 1040 of FIG. 10B. In another example, a read PUF may be designed to have values opposite to those of the above-described example.

When $t_{th.max} \geq t \geq t_{th.nor}$ is satisfied, as indicated by reference numeral 1020 of FIG. 10B, and when $t_{th.min} \leq t \leq t_{th.nor}$ is satisfied, as indicated by reference numeral 1030 of FIG. 10B, time invariance of the read $R_{via}$ may be determined not to be guaranteed. The identification key generation apparatus may increase reliability of a finally provided identification key by excluding a resistor with time invariance expected not to be guaranteed when an identification key is read by the reader.

Figure 11:
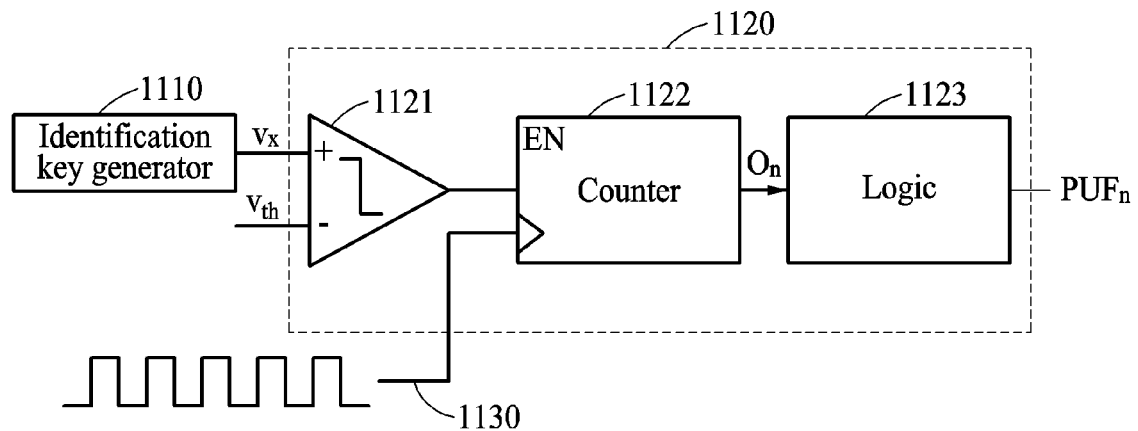
FIGS. 11 and 12 are diagrams illustrating a reader of an identification key generation apparatus according to an embodiment.
Figure 12:
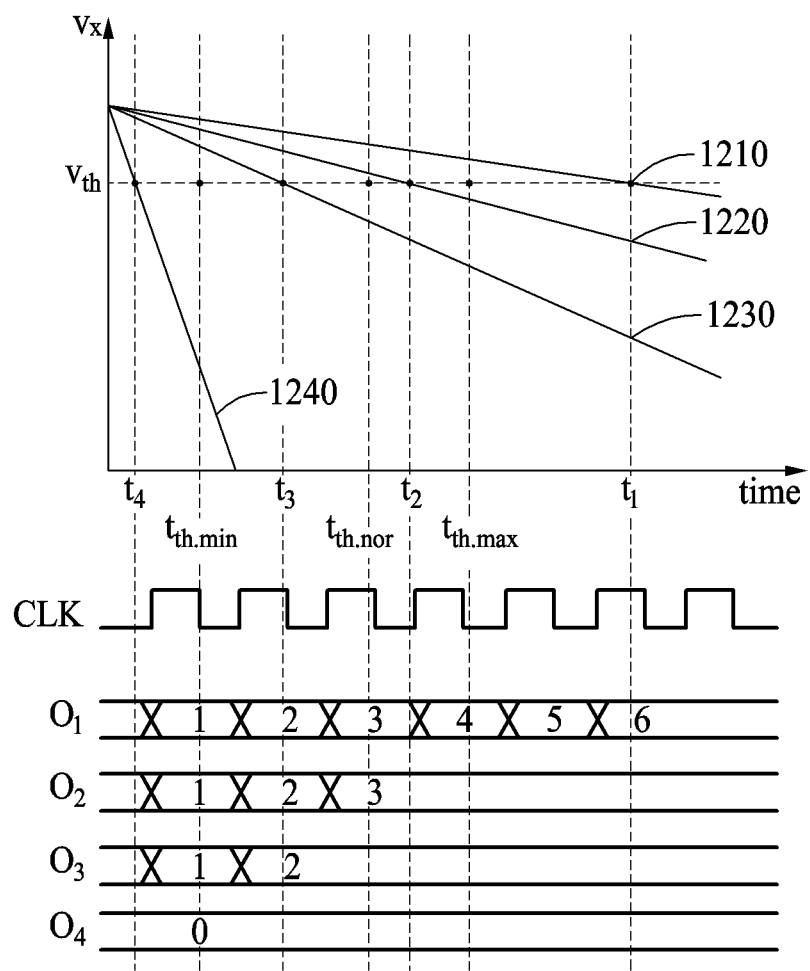

FIGS. 11 and 12 are diagrams illustrating a reader of an identification key generation apparatus according to an embodiment.

In an example, to measure an amount of time in which a pulled-up voltage is discharged to a threshold voltage $V_{th}$ after a selection transistor is turned on, a reader 1120 may measure, based on a clock 1130, a duration during which an output voltage $V_x$ of an identification key generator 1110 is maintained to be greater than or equal to the threshold voltage $V_{th}$. To this end, the reader 1120 may include a comparator 1121, a counter 1122, and a logic 1123.

For example, the reader 1120 may compare, using the comparator 1121, the output voltage $V_x$ of the identification key generator 1110 to the threshold voltage $V_{th}$. When $V_x \geq V_{th}$ is satisfied, a value of "1" may be provided to an enable signal EN of the counter 1122. When the duration during which the output voltage $V_x$ of the identification key generator 1110 is maintained to be greater than or equal to the threshold voltage $V_{th}$ is measured based on a clock, as described above, the reader 1120 may verify, using the logic 1123, an identification key generator with time variance by comparing an output $O_n$ of the counter 1122 to a first threshold time $t_{th.min}$ and/or a second threshold time $t_{th.max}$, and may read a final identification key by comparing the output $O_n$ to a third threshold time $t_{th.nor}$.

In an example, PUF=1 may be read when $t \geq t_{th.nor}$ is satisfied, as indicated by reference numerals 1210 and 1220 of FIG. 12, and PUF=0 may be read when $t \leq t_{th.nor}$ is satisfied, as indicated by reference numerals 1230 and 1240 of FIG. 12. In another example, a read PUF may be designed to have values opposite to those of the above-described example.

When $t_{th.max} \geq t \geq t_{th.nor}$ is satisfied, as indicated by reference numeral 1220 of FIG. 12, and when $t_{th.min} \leq t \leq t_{th.nor}$ is satisfied, as indicated by reference numeral 1230 of FIG. 12, time invariance of the read $R_{via}$ may be determined not to be guaranteed. The identification key generation apparatus may increase reliability of a finally provided identification key by excluding a resistor with time invariance expected not to be guaranteed when an identification key is read by the reader.

The units described herein may be implemented using hardware components, software components, and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An identification key generation apparatus comprising:
   an identification key provider configured to provide a plurality of resistors generated based on a random connection state between conductive layers of a semiconductor due to a semiconductor process variation;
   a discriminator configured to discriminate a first group of the plurality of resistors whose time invariance in magnitude comparison with a third threshold value is not guaranteed on the basis of having a resistance value greater than a first threshold value and less than a second threshold value among the plurality of resistors, and the first group discriminated based on increased time variance; and
   a reader configured to read at least one resistor that does not belong to the first group among the plurality of resistors, and to provide an identification key in a form of a digital value based on the read resistance value,
   wherein the third threshold value is greater than the first threshold value and less than a second threshold value.

2. The identification key generation apparatus of claim 1, further comprising:
   a controller configured to record, in a memory, information used to identify a resistor included in the first group among the plurality of resistors.

3. The identification key generation apparatus of claim 2, wherein the information used to identify the resistor included in the first group is an address of the resistor included in the first group among the plurality of resistors.

4. The identification key generation apparatus of claim 1, wherein the plurality of resistors are either vias or contacts located between the conductive layers.

5. The identification key generation apparatus of claim 1, wherein the discriminator comprises:
   a first discrimination element configured to determine whether a value of each of the plurality of resistors is greater than the first threshold value, in a first time interval; and
   a second discrimination element configured to determine whether a value of each of the plurality of resistors is greater than the second threshold value, in a second time interval different from the first time interval.

6. The identification key generation apparatus of claim 5, wherein
   the discriminator further comprises a third discrimination element configured to determine whether a value of each of the plurality of resistors is greater than the third threshold value, the third threshold value being greater than the first threshold value and less than the second threshold value, and
   the reader is configured to provide the identification key based on a result of a comparison between the third threshold value and a value of at least one resistor that does not belong to the first group among the plurality of resistors.

7. An identification key generation apparatus comprising:
   an identification key provider configured to provide a plurality of resistors generated based on a random connection state between conductive layers of a semiconductor due to a semiconductor process variation;
   a discriminator configured to discriminate a first group of the plurality of resistors whose time invariance in magnitude comparison with a third threshold value is not guaranteed on the basis of having a resistance value greater than a first threshold value and less than a second threshold value among the plurality of resistors, using a pull-up resistor configured to pull an output voltage applied to each of the plurality of resistors up to a supply voltage in an off state of a selection transistor, and the first threshold value and second threshold value based on excluding resistors with resistance values that vary over time; and a reader configured to read at least one resistor that does not belong to the first group among the plurality of resistors and to provide an identification key in a form of a digital value, wherein the third threshold value is greater than the first threshold value and less than a second threshold value.

8. The identification key generation apparatus of claim 7, wherein the discriminator is configured to discriminate, as the first group, a resistor at which a time required to discharge the output voltage to be less than or equal to a threshold voltage after the selection transistor is turned on is greater than a first threshold time and less than a second threshold time, among the plurality of resistors.

9. The identification key generation apparatus of claim 8, wherein the reader is configured to read the identification key based on a result of a comparison between a third threshold time and the time required to discharge the output voltage to be less than or equal to the threshold voltage, using at least one resistor that does not belong to the first group among the plurality of resistors, the third threshold time being greater than the first threshold time and less than the second threshold time.

10. The identification key generation apparatus of claim 7, wherein the discriminator is configured to discriminate, as the first group, a resistor of which the output voltage is greater than a first threshold voltage and less than a second threshold voltage when a predetermined reference time elapses after the selection transistor is turned on, among the plurality of resistors.

11. The identification key generation apparatus of claim 10, wherein the reader is configured to read the identification key based on a result of a comparison between the output voltage and a third threshold voltage, using at least one resistor that does not belong to the first group among the plurality of resistors, the third threshold voltage being greater than the first threshold voltage and less than the second threshold voltage.

12. A method of managing an identification key generation apparatus, the method comprising:

discriminating a first group of the plurality of resistors whose time invariance in magnitude comparison with a third threshold value is not guaranteed on the basis of having a resistance value greater than a first threshold value and less than a second threshold value among a plurality of resistors generated based on a random connection state between conductive layers of a semiconductor due to a semiconductor process variation, and the first group of resistors having greater time variance of their resistance values than resistors not in the first group; and reading at least one resistor that does not belong to the first group among the plurality of resistors and generating an identification key in a form of a digital value, wherein the third threshold value is greater than the first threshold value and less than a second threshold value.

13. The method of claim 12, further comprising: recording, in a memory, information used to identify a resistor included in the first group among the plurality of resistors.

14. The method of claim 13, wherein the information used to identify the resistor included in the first group is an address of the resistor included in the first group among the plurality of resistors.

15. The method of claim 12, wherein the plurality of resistors are either vias or contacts located between the conductive layers.

16. The method of claim 12, wherein the discriminating of the first group comprises:

determining whether a value of each of the plurality of resistors is greater than the first threshold value, in a first time interval; and determining whether a value of each of the plurality of resistors is greater than the second threshold value, in a second time interval different from the first time interval.

17. The method of claim 16, wherein the discriminating of the first group further comprises determining whether a value of each of the plurality of resistors is greater than the third threshold value, the third threshold value being greater than the first threshold value and less than the second threshold value, and the generating of the identification key comprises generating the identification key based on a result of a comparison between the third threshold value and a value of at least one resistor that does not belong to the first group among the plurality of resistors.

18. A non-transitory computer-readable storage medium storing instructions that, when executed by a processor, cause the processor to perform the method of claim 12.

19. The method of claim 16, wherein resistors not in the first group have resistance values which do not vary with time.

20. The identification key generation apparatus of claim 1, wherein the first threshold value is selected such that resistors that do not belong to the first group have resistance value that do not vary with time.

* * * * *